(12) United States Patent  
Rao et al.

(10) Patent No.: US 9,825,987 B2
(45) Date of Patent: Nov. 21, 2017

(54) APPLICATION GRAPH BUILDER

(71) Applicant: Twitter, Inc., San Francisco, CA (US)

(72) Inventors: Deepak Rao, San Francisco, CA (US);
Argyrios Zymnis, San Francisco, CA (US); Kelton Lynn, San Francisco, CA (US); Michael Ducker, San Francisco, CA (US); Sean Cook, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 25 days.

(21) Appl. No.: 14/699,922

(22) Filed: Apr. 29, 2015

(65) Prior Publication Data

US 2015/0319181 A1   Nov. 5, 2015

Related U.S. Application Data

(60) Provisional application No. 61/986,815, filed on Apr. 30, 2014.

(51) Int. Cl.
 G06F 17/30 (2006.01)
 H04L 29/06 (2006.01)
 H04L 12/58 (2006.01)
 G06Q 10/06 (2012.01)

(52) U.S. Cl.
 CPC ........ *H04L 63/145* (2013.01); *G06F 17/3053* (2013.01); *G06F 17/30321* (2013.01); *G06F 17/30887* (2013.01); *G06F 17/30958* (2013.01); *G06Q 10/06* (2013.01); *H04L 51/12* (2013.01)

(58) Field of Classification Search
 CPC .................... G06F 17/30522; G06F 17/3053
 See application file for complete search history.

(56) References Cited

U.S. PATENT DOCUMENTS

| | | | |
|---|---|---|---|
| 8,838,589 B1* | 9/2014 | Tam | G06F 17/30702 707/732 |
| 2004/0261107 A1* | 12/2004 | Lee | H04N 7/163 725/46 |
| 2007/0061332 A1* | 3/2007 | Ramer | G06Q 30/0241 |
| 2008/0077574 A1* | 3/2008 | Gross | G06F 17/30699 |
| 2014/0067597 A1* | 3/2014 | Kirkby | G06Q 30/0631 705/26.7 |
| 2014/0081965 A1* | 3/2014 | Gross | G06F 17/30699 707/732 |
| 2014/0317038 A1* | 10/2014 | Mojsilovic | G06Q 10/00 706/46 |

* cited by examiner

*Primary Examiner* — William Powers
(74) *Attorney, Agent, or Firm* — Fenwick & West LLP

(57) ABSTRACT

Disclosed is a system for recommending content of a predefined category to an account holder, or account holders based on the account holder application graphs. The system receives information corresponding to applications executing on the client device of the account holders and generates an application graph for each account holder that includes a list of predefined application categories that are preferred by the account holder. For each predefined category, a list of account holders preferring content relevant to that category is predicted based on the set of generated application graphs.

36 Claims, 6 Drawing Sheets

APPLICATION GRAPH BUILDER

CROSS REFERENCE TO RELATED APPLICATIONS

This application claims the benefit of U.S. Provisional Patent Application No. 61/986,815 filed on Apr. 30, 2014. The content of U.S. Patent Application No. 61/986,815 is incorporated by reference in its entirety.

BACKGROUND

Field of Art

The disclosure generally relates to the field of recommending applications to account holders or determining spam applications, based on an application graph built for the account holder.

Description of Art

There are plenty of mobile applications available and most of the applications include targeted advertisements (ad) for an account holder of the application. The advertisements or the application in general may not always generate useful or good content. Some applications may generate advertisements or messages that may be abusive, in general, may generate bad content. Some applications may be designed to create a fraud, e.g., a click fraud wherein an application clicks on a targeted ad every few minutes. While this activity may make generate revenue every time the ad is clicked on, the longer term impact can be negative as advertisers become frustrated about paying for such ads that have not actually been viewed or for which no meaningful interaction has occurred.

In addition to advertisement fraud, there may be automated account holders or regular account holders in a messaging system that generate irrelevant or fraudulent content, or content of an abusive nature, in the messaging stream of other legitimate account holders. These account holders are generally termed as spam account holders and it is desirable to detect and report these account holders.

Besides fraud, the targeted ads or content sent from a spam account holder may be irrelevant to an account holder of the application and the desired impact of the account holder downloading and executing the targeted ad or following the messages from the spam account holder are low.

Accordingly, determining a spam application or a spam account holder on a client device and generating recommendations that are relevant to an account holder of a client device are highly desired.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
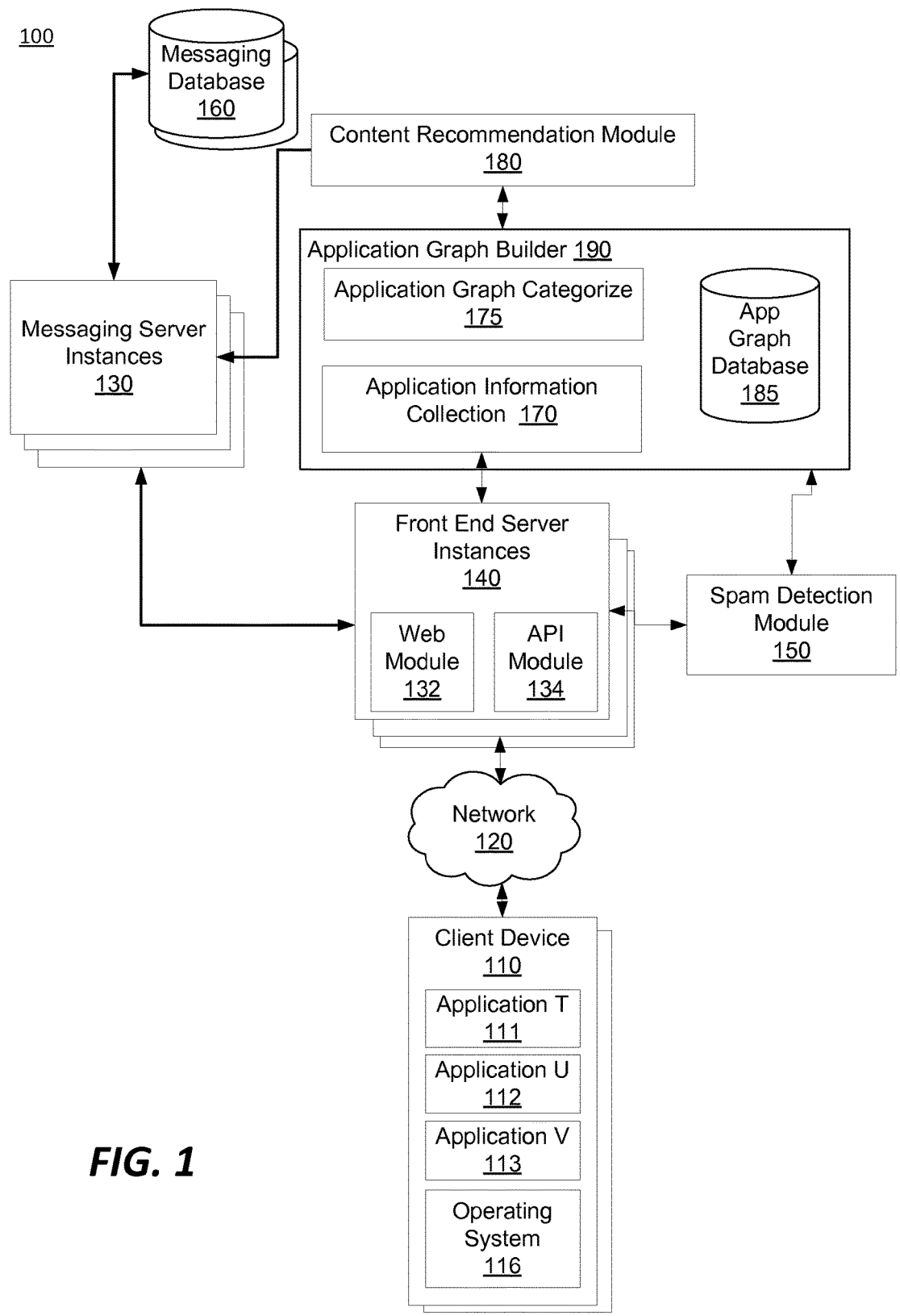
FIG. 1 illustrates the computing environment of computing devices for determining application graphs of a client device, according to one embodiment.

FIG. 1 illustrates an example computing environment 100. As shown, the computing environment 100 includes client devices 110(0)-110(N) (collectively, client devices 110, and, individually, client device 110), a network 120, a front end server 140, a number of messaging server instances 130, a messaging database 160, an application graph builder 190 and an application graph database 185. It is noted that the front end server 140 may comprise one or more server computing machines.

Account holders (in general account holders) use client devices 110 to access a messaging system in order to publish messages and view and curate their streams. A client device 110 is a computer including a processor, a memory, a display, an input device, and a wired and/or wireless network device for communicating with the front end server 140 of the messaging system over network 120. For example, a client device 110 may be a desktop computer, a laptop computer, a tablet computer, a smart phone, or any other device including computing functionality and data communication capabilities.

Each client device 110 includes an operating system, such as operating system 116. The operating system 116 is a software component that manages the hardware and software resources of the client device 110. The operating system 116 also provides common services to other software applications executing on the client device 110. These services may include power management, network management, inter-application communication, etc.

The client devices 110 also include software applications, such as application T 111, application U 112, and application V 113, comprised of instructions that execute on the processor included in the respective client device 110. Each application executing on the client device 110 is associated with a unique application identifier and performs various functions. Examples of such applications may be a web browser, a social networking application, a messaging application, a gaming application, and a media consumption application. While each of the client devices 110 may include similar applications, reference will be made only to application T 111 and application U 112 executing on client device 110(0) for the remaining discussion.

The processor of the client device 110 operates computer software 112 configured to access the front end server 140 of the messaging system so that the account holder can publish messages and view and curate their streams. The software 112 may be a web browser, such as GOOGLE CHROME, MOZILLA FIREFOX, or MICROSOFT INTERNET EXPLORER. The software 112 may also be a dedicated piece of software designed to work specifically with the messaging system. Generally, software 112 may also be a Short Messaging Service (SMS) interface, an instant messaging interface, an email-based interface, an API function-based interface, etc.

The network 120 may comprise any combination of local area and/or wide area networks. The network can include the Internet and/or one or more intranets, using either wired and/or wireless communication systems.

The messaging system generally provides account holders with the ability to publish their own messages and view messages authored by other accounts. Messages may take a variety of forms including, digital text, videos, photos, web links, status updates, blog entries, tweets, profiles, and the like. The messaging system also may provide various complementary services such as those provided by computing message services and systems such as social networks, blogs, news media, forums, user groups, etc. Additionally, the messaging system could recommend content to an account holder via targeted ads. Examples of messaging systems include FACEBOOK and TWITTER. The messaging system is a distributed network including multiple computing devices, where each computing device in the system includes computer hardware specifically chosen to assist in the carrying out of its specific purpose.

The client device 110 interface with the messaging system through a number of different but functionally equivalent front end servers 140. The front end server 140 is a computer server dedicated to managing network connections with remote client devices 110. As the messaging system may have many millions of accounts, there may be anywhere from hundreds of thousands to millions of connections being established or currently in use between client devices 110 and the front end server 140 at any given moment in time. Including multiple front end servers 140 helps balance this load across multiple countries and continents.

The front end server 140 may provide a variety of interfaces for interacting with a number of different types of client devices (or client) 110. For example, when an account holder uses a web browser 112 to access the messaging system, a web interface module 132 in the front end server 140 can be used to provide the client device 110 access. Similarly, when an account holder uses an application programming interface (API) type software 112 to access the messaging system, an API interface module 134 can be used to provide the client device 110 access.

The front end server 140 is further configured to communicate with the other backend computing devices of the messaging system. These backend computing devices carry out the bulk of the computational processing performed by the messaging system as a whole. The backend computing devices carry out any functions requested by a client device 110 and return the appropriate response (s) to the front end servers 140 for response to the client device 110.

The backend computing devices of the messaging system include a number of different but functionally equivalent messaging servers 130. This functionality includes, for example, publishing new messages, providing message streams to be provided upon a request from a client device 110, managing accounts, managing connections between accounts, messages, and streams, and receiving engagement data from clients engaging with messages. The application graph builder 190 and its associated modules, a content recommendation module 180 and a spam detection module 150 are described below in reference to FIG. 2.

Application Graph Builder

Using the messaging server 130 as described with FIG. 1, account holders can form connections with accounts, create streams of messages and engage with those messages. In addition to populating the message streams, the messaging system can provide content to the account holder that the account holder will perceive as useful. To do this, the messaging system uses the application graph builder 190 to identify a category of applications that the account holder finds interesting and recommend content based on the identified categories of applications.

Figure 2:
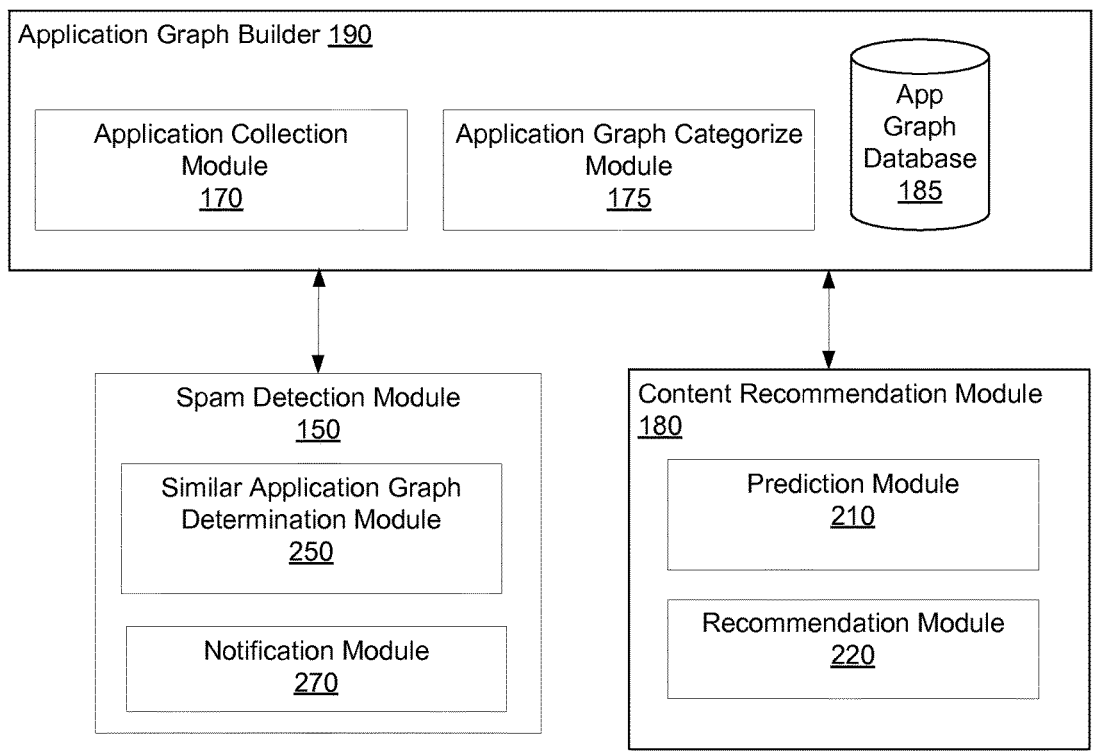
FIG. 2 illustrates the logical components of an application graph builder and its associated modules, according to one embodiment.

Referring now to FIG. 2, illustrated are the logical components of an application graph builder and its associated modules, according to one embodiment. The application graph builder 190 include an application information collection module 170, an application graph categorize module 175 and an associated application graph database 185. The spam detection module 150 accesses the application graph data stored in the application graph database 185 to detect a spam application or a spam account holder on a client device 110. The content recommendation module 180 accesses the application graph data stored in the application graph database 185 to recommend content such as applications, advertisements, other account holders to follow, etc. to the account holders of the messaging server 130.

The application information collection module 170 receives information about the applications executing on one or more client devices 110. The account holder of the client device 110 may opt out of information collection from their client device 110. The information may include the name of an application, the running time for an application, the usage time of an application, the version of an application and other such information. Based on the collected information, the application information collection module 170 can infer signals such as the frequently running applications, active applications, dormant applications, keywords for applications that may indicate a category for the application. The process for extracting the application information may be different based on the operating system 116 of the client device 110. For example, the Android operating system allows access by a developer to the running applications information on the client device 110. In case of iOS the application information is inferred based on background tasks such as central processing unit (CPU) usage, deep link information or random access memory (RAM) usage of the application.

The application information along with the inferred signals is sent to the application graph categorize module 175. The application graph categorize module retrieves a predefined set of categories for applications from the application graph database 185. Examples of predefined categories include sports applications, fitness applications, news applications and the like. Optionally, for each predefined category, each of the inferred signals for an application is assigned a static weight. For each account holder, a linear combination of weights of a predefined category is calculated for every application. Based on the numerical score of each application of the account holder for the predefined category, the category is tagged to the account holder data set. For example, for a fitness category, each signal such as the keywords, active application time, usage time and description may be given a static weight, e.g. (1, 1, 1, 1). Further, by way of example, if a "fitbit" and a "weight watchers" application information is received for an account holder, the values for each of the signals indicate (1, 1, 1, 1) for "fitbit" and (1.0, 0.2, 0.1, 0.5) for "weight watchers". Based on the values of the signals and the weights, both the applications can be categorized as fitness applications. The account holder data set is tagged with the predefined category fitness.

The application graph for each account holder includes account holder identification (generally termed as account holder id) and an associated list of predefined categories (these are the categories that the account holder is interested inferred based on the application information of the account holder). These application graphs for the account holders are stored in the application graph database 185.

Optionally, the application graph builder 190 may build the application graph at predefined times (e.g., at 10 AM, 2 PM and 5 PM), predefined time periods (e.g. every hour or every 24 hours), or in response to a request from the spam detection module 150 or the content recommendation module 180.

Spam Detection Module

The spam detection module 150 includes a similar application graph determination module 250 and a notification module 270. The spam detection module 150 may receive a request to detect a spam application or may periodically check for spam applications. In response to the request, the spam detection module 150 requests the application graph module 190 to build an application graph for the client device of each account holder.

The application graph for each account holder is sent to the similar application graph determination module 250. The similar application graph determination module 250 retrieves a set of previously detected and tagged spam application graphs from the application graph database and compares it to the received application graph. A spam application graph is an application graph of an account holder that may be previously detected to be a spammer, for example, the spammer may be a robot application that has a single application installed (e.g., an application that clicks on targeted ads). The example spammer does not download any other applications on its client device. The application graph of such an account holder may include a single application and the usage time for the application may be 100%. Such application graphs are detected and tagged as spam and are stored in the application graph database 185.

If the received application graph matches any one of the application graphs associated with a spammer (spam application graph), the received application is tagged as a spam as well and stored in the application graph database 185.

If the received application graph is very similar (e.g. 80% comparison match, could be programmatically set to N % comparison match) to one or more spam application graphs, additional information signals such as number of downloads of applications in a time in history, usage time for applications and other such signals are retrieved from the application graph database 185. Based on these additional information signals, it may be determined that the received application graph is a spam application or a spam account holder. For example, it may be determined from the additional information signals that a spam account holder has not downloaded applications on their client device for a long time or the usage time for applications other than a spam application, may be minimal, or messages of abusive nature may be detected, that were sent from the client device of the spammer.

If the received application graph does not match the spam application graphs, the similar application determination graph module 250 searches for a set of similar application graphs from the application graph database 185 that may not be tagged as spam. If a set of similar applications is found, the similarity may be based on a similarity score (e.g. 80% match of each application category on the application graph, could be programmatically set to N % comparison match), the received application graph is as not a spam. If there are no similar application graphs found, additional information signals such as number of downloads of applications in a time in history, usage time for applications and other such signals are retrieved from the application graph database 185. Based on these additional information signals, it may be determined that the received application graph is a spam application.

On determination of a spam application, the notification module 270 may notify a set of account holders or a set of other applications on one or more client devices about the spam application. Additionally, a set of advertising networks or third party agencies that may have requested information on spam applications may be notified as well. The notification may be sent via electronic communication such as email, messages, tweets, push notifications or other similar methods.

Figure 3:
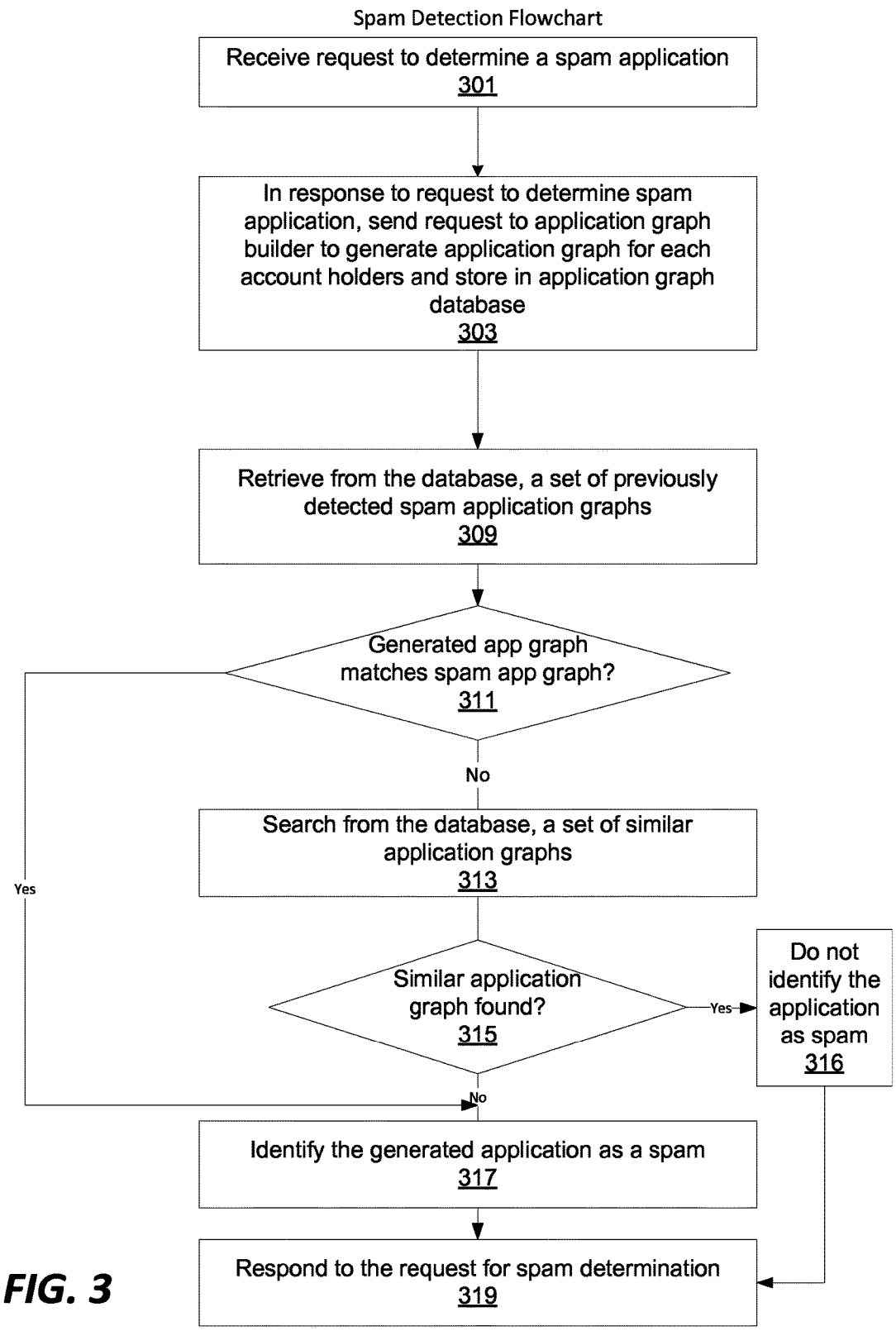
FIG. 3 is a flowchart of a method for building an application graph to detect spam applications and notifying a plurality of other applications, according to one embodiment.

Referring now to FIG. 3, is a method for building an application graph to detect spam applications and notifying a plurality of other applications by the spam detection module, according to one example embodiment. The spam detection module 150 receives 301 a request to determine a spam application. In response to the request, the spam detection module 150 sends (or transmits) 303 a request to the application graph builder 190. The application graph builder 190 generates an application graph for the client device 110 of each account holder and store the built application graph in the application graph database 185.

The spam detection module 150 retrieves 309, from the database, a set of previously detected spam application graphs. The spam detection module 150 matches 311 the generated application graph of each account holder with the retrieved set of previously detected spam application graphs. If a match is detected, the matched application graph is identified 317 and added to the list of detected spam application graphs.

If a match is not found, the spam detection module 150 searches 313 the application graph database 185 for a set of similar application graphs. It is noted that in one example embodiment a similar application graph is an application graph that matches N % (e.g. 80%) when compared to the generated application graph. If a similar application graph is found 315, the generated application graph of the account holder is not identified 316 as a spam.

If no similar application graphs are found 315 for an account holder, the generated application graph account holder or the application is labelled 317 as spam and added to the list of detected spam application graphs in the application graph database 185. The determination result, which includes a list of spam applications, if any are found, is sent 319 to the requestor (e.g. third party applications, ad networks, application developers, etc.) in response to the request. Additionally, other applications or account holders of client devices may be notified of spam applications or account holders by way of electronic communication such as electronic mail (email), tweets, push notification, or messages.

Content Recommendation Module

Referring back to FIG. 2, the content recommendation module 180 may receive a request to recommend content for a set of account holders, or to recommend account holders for an application of a predefined category. Alternatively, the content recommendation module 180 may periodically recommend content to account holders based on their application graphs.

The content recommendation module 180 includes a prediction module 210 and a recommendation module 220. The prediction module 210 predicts if an account holder would prefer to receive recommendations related to an application of one of a predefined categories based on the application graph for the account holder. For each of the categories, the prediction module 210 retrieves from the application graph database 185, a set of account holders and their application graphs. It is noted that the preference of the account holder for the subject category is unknown at this time of retrieval. Based on the retrieved data, the prediction module 210 predicts the preference of each account holder using a computer model that applies a machine learning method such as logistic regression or other such similar algorithm. Accordingly, the preference of each of the set of account holders for each category is predicted.

Prediction Model Example

Figure 4:
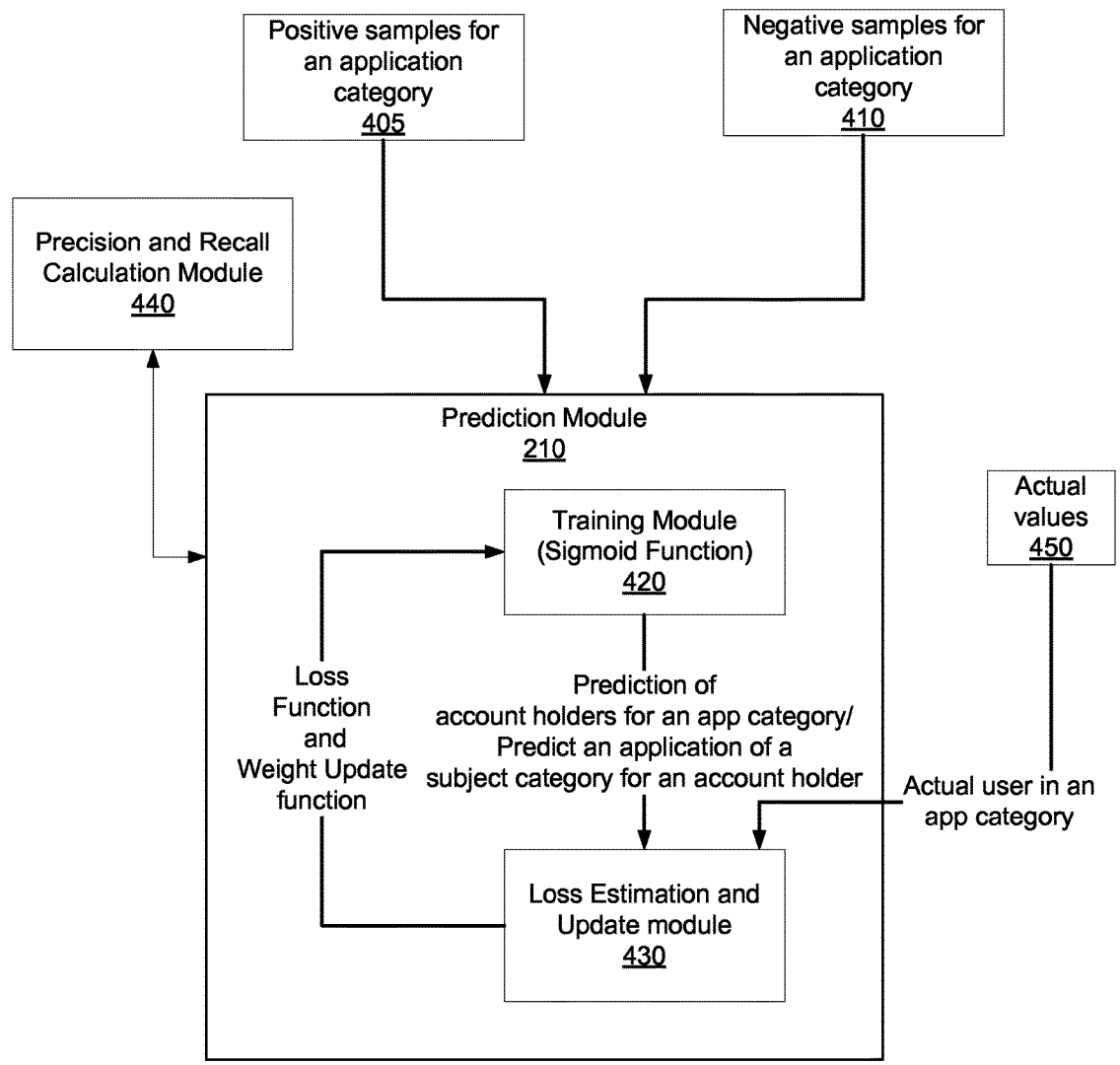
FIG. 4 is a block diagram of the logical components of a prediction module for recommending account holders for an application category, according to one embodiment.

FIG. 4 is a block diagram of the logical components of a prediction module for recommending account holders for an application category, according to one example embodiment. The prediction module 210 includes a training module 420, a loss estimation and update module 430 and a precision and recall calculation module 440. The training module 420 receives an application of a predefined category and a set of account holders that have an unknown preference for the predefined category and the application graph for the set of account holders.

The training module 420 further retrieves by querying the application graph database 185 a set of positive samples 405 and a set of negative samples for a predefined category. The positive samples include a set of account holders that prefer the predefined category and the negative samples include a set of account holders that do not prefer the predefined category. The corresponding application graphs $G(g_1 \ldots g_n)$ of the positive and negative samples are retrieved from the database. It is noted that $g_1 \ldots g_n$ represents features of an application graph for a predefined category. For example, the data associated with a fitness category may include number of fitness applications $r_1$, usage time of the fitness applications $r_2$, number of weight training applications $r_3$, number of outdoor activity applications and other such data.

The features $g_1 \ldots g_n$ of the application graphs G are initialized with a weight $w_{r1} \ldots w_{rn}$ equal to 1. The weight for each feature of the application graphs G is non-negative and is maintained by the training module 420. The training module 420 further receives training values $\{y_1 \ldots y_n\}$ for $\{g_1 \ldots g_n\}$ from the retrieved application graphs G. The training module 420 identifies a set of account holders that are likely to prefer an application of a predefined category based on a function that applies logistic regression method (e.g. sigmoid function) based on the weights $(w_{r1} \ldots w_{rn})$ and values $(y_1 \ldots y_n)$ of the features of the application graphs G and a threshold n that represents the classification boundary for prediction. The function may be represented as:

$h(x)=g(f(x))$ where $f(x)=wr0+\Sigma_{j=1}^{n} wrj \cdot yrj$ and g(f(x)) represents the sigmoid function. The sigmoid function transforms the value of f(x) into the range between 0 and 1. Further, the classification boundary for prediction is given by:

If h(x)>n; then predict 1; else predict 0, where n ranges from 0 to 1.

The following example provides additional details for the prediction. In this example, the predefined category is fitness. The initial weights $(w_{r1}, w_{r2}, w_{r3})$ will be (1,1,1) for features $(g_1,g_2,g_3)$. Further, let's assume a training data set is of the format, $(y_1,y_2,y_3)$->X where X represents the actual value of the preference of the positive account holders for the predefined category. Let's assume the values retrieved from the database for y1, y2, y3 and X are (20,20,10)->1. The values indicate an average value of the set of account holders representing the positive samples, i.e. 20 account holders had fitness applications on their list, 20 account holders had weight watcher applications on their list, etc. In this example, f(x) is 50, and let h(x)=0.5 i.e., the predicted value is 0.5 which is close to the classification boundary, and hence a prediction of 1. A prediction is similarly made for each account holder with an unknown preference for the predefined category at the time of retrieval from the application graph database 185.

The loss estimation module 430 receives an actual list of account holders from the actual values module 450 that preferred an application of a subject category. The training module 420 is updated based on a weight update function β derived from the confidence of the prediction of the list of the account holders for a predefined category when compared to the actual list of account holders that preferred the predefined category. The weight update function β implies a measure how well the training module 420 identified the set of account holders that would prefer applications of a predefined category.

The weight update function β is as follows:

$\beta=-\log(h(x))$ if $X=1$ $\beta=-\log(1-h(x))$ if $X=0$

For a predefined category, assume an account holder has a prediction X=1, with a confidence value h(x)=0.6. The confidence value indicates that the account holder has a high probability of preferring content from the predefined category. The actual value received for the same account holder is X=0, i.e. the account holder does not prefer content relevant to the predefined category. The confidence value was higher by an amount of 0.6 indicating a low confidence prediction. Hence the weight updated function demotes the weights related to the prediction by a value α. Alternatively, if the confidence value was around 0.2 indicating a high confidence prediction, the weight updated function promotes the weights related to the prediction by a value α such that the prediction is at an exact value of 0. If the account holder has an exact confidence value such as 1.0 and the actual value indicates X=1 as well, the weights are not adjusted.

Based on the predictions for each category, in one example embodiment two metrics are further calculated. Specifically, the precision and recall calculation module 440 calculates the precision metric and the recall metric. The precision metric for a category is a measure of how many selected account holders are relevant for the predefined category and the recall metric is a measure of how many relevant account holders were selected for the predefined category. The prediction module 210 is trained to achieve a predetermined value of precision and recall for each predefined category, for example 70% of precision and recall for all categories. The metrics are calculated as follows:

$$\text{Precision} = \frac{\text{No. users classified as positive and are actually positive}}{\text{No. users classified as positive}}$$

$$\text{Recall} = \frac{\text{No. users classified as positive and are actually positive}}{\text{No. users that are positive}}$$

Referring back to FIG. 2, the recommendation module 220 receives the prediction results for each predefined categories for each account holder. The recommendation module 220 may recommend content such as application, advertisements, messages to the account holder based on the predicted results or an application of a predefined category may request for recommendation of account holders that would prefer the application.

Figure 5:
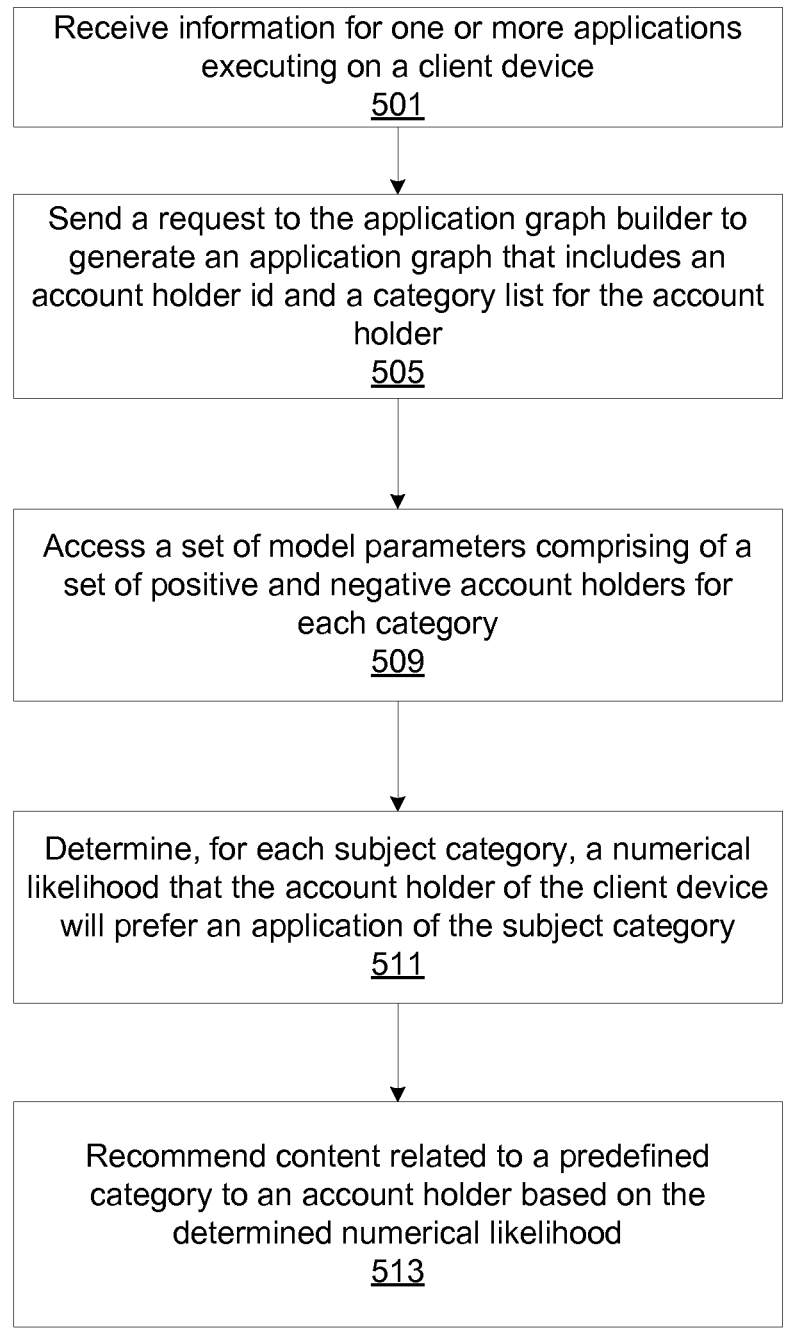
FIG. 5 is a flowchart of a method for building an application graph to recommend content of predefined category to account holders, according to one embodiment.

Referring now to FIG. 5, shown is a flowchart of a method for building an application graph to recommend content of predefined category to account holders, according to one example embodiment. The content recommendation module 180 receives 501 information for one or more applications executing on a client device used by one or more account holders. The content recommendation module 180 further requests 505 the application graph builder 190 to generate an application graph for each of the account holders. The application graph includes the account holder id and a list of predefined categories determined based on the received application information. The content recommendation module may receive a request from an application of a predefined category to recommend account holders for the application.

For each predefined categories, a preference of an account holder for a predefined category is determined 511, by accessing 509 a set of model parameters that comprise of a set of previously determined positive and negative account holders for each category. Based on the determination (by way of calculating the numerical likelihood of a user preference for a predefined category), an account holder is recommended content related to the predefined category.

Example Machine Architecture

Figure 6:
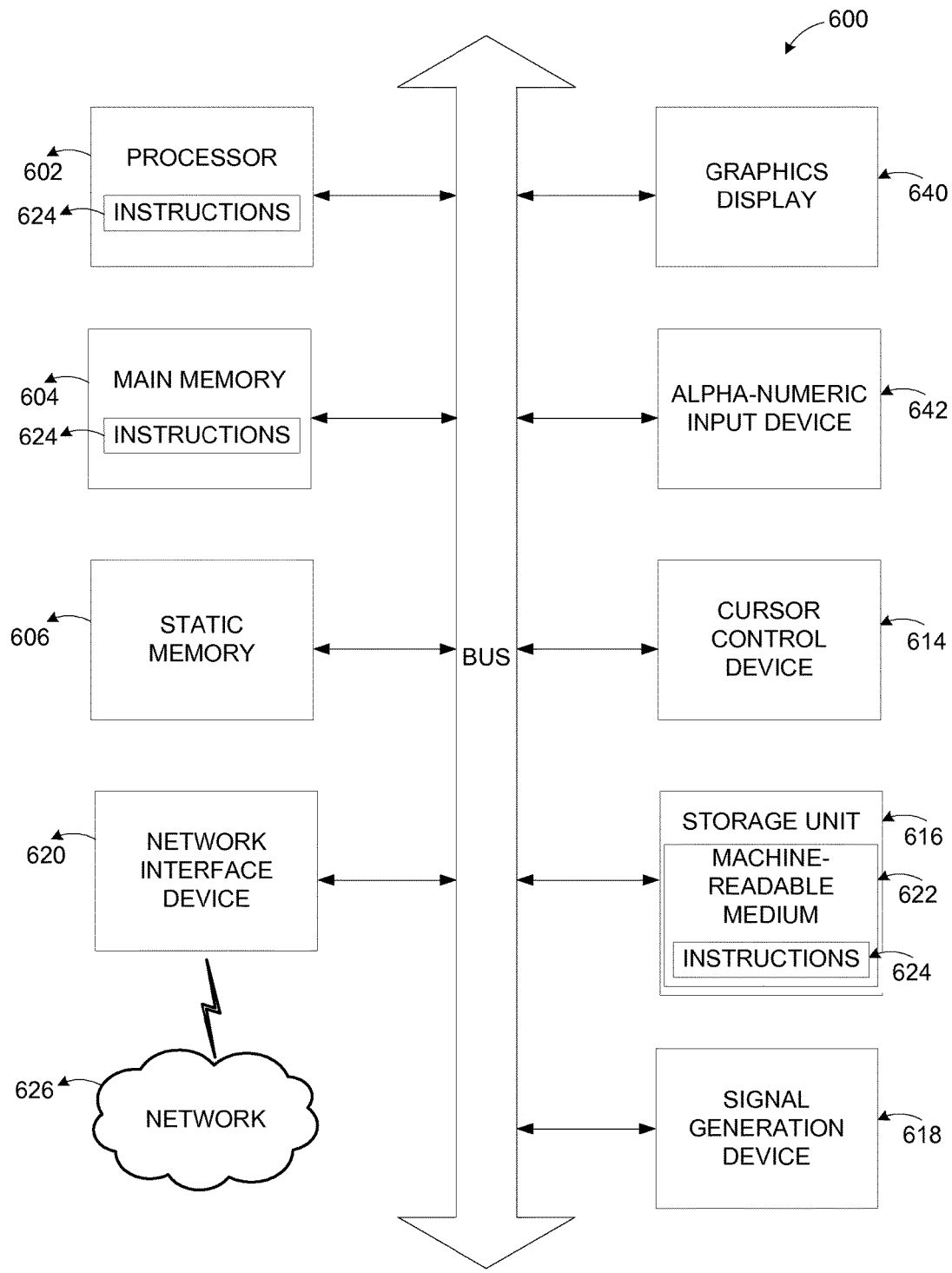
FIG. 6 is a block diagram illustrating components of an example machine able to read instructions from a machine-readable medium and execute them in a processor (or controller).

FIG. 6 is a block diagram illustrating components of an example machine (or device) able to read instructions from a machine-readable medium and execute them in a processor (or controller), such as by a processor of client device 110, identity server 130, or application server 150. Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein, for example with respect to FIGS. 1-3. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an Internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 606 can include a static memory 606, a display driver 140 (e.g., to drive a plasma display panel (PDP), a liquid crystal display (LCD), or a projector). The computer system 600 may also include alphanumeric input device 642 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Example benefits and advantages of the disclosed configurations include recommending content relevant to a predefined category to an account holder based on their preference for the predefined category. The content recommendation is based on application graphs generated for each account holder. Alternatively, the application graphs can be useful for determination of spam applications or spam account holders in the system. Further, a set of third-party applications, an ad network or application developers can be notified of these spam application or spam account holders.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for recommending content or detection spam applications based on application graphs built for account holders, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-executed method for recommending applications of a predefined category to an account holder, the method comprising:
   receiving information corresponding to one or more applications executing on a client device of an account holder;
   generating an application graph for each account holder based on the received information, wherein the application graph is a representation of usage information of applications on the client device at least including a list of predefined application categories;
   applying, for each predefined category, a computer model including a set of determined model parameters to determine a numerical likelihood that the account holder will prefer receiving applications related to the predefined category based on the generated application graph and model parameters;
   wherein the determined model parameters include a set of model account holders having a positive or negative preference for the predefined category; and
   recommending at least one other application of the predefined category to an other account holder, the at least one other application able to execute on an other client device of the other account holder, based on the numerical likelihood.

2. The computer-executed method of claim 1, wherein the client device associated with a model account holder having a positive preference is an account holder that has an application of the predefined category executing on the client device.

3. The computer-executed method of claim 1, wherein the client device associated with a model account holder having a negative preference is an account holder that has an application of the predefined category executing on the client device.

4. The computer-executed method of claim 1, further comprising determining the set of model parameters for the computer model by:
   receiving a set of metrics samples associated with previously recommended applications, the metrics samples including
      a set of targeted account holders predicted to prefer applications associated with the predefined category, and
      a set of accurate account holders predicted to prefer applications associated with the predefined category and having a positive preference to the application associated with the predefined category;
   determining a precision function based on the comparison of the targeted account holders and accurate account holders;
   updating the set of model parameters based on the precision function.

5. The computer-executed method of claim 1, further comprising determining the set of model parameters for the computer model by:
   receiving a set of metrics samples associated with previously recommended applications, the metrics samples including
      a set of accurate account holders predicted to prefer applications associated with the predefined category and having a positive preference to the application associated with the predefined category, and
      a set of absent account holders having a positive preference to the application associated with the predefined category;
   determining a recall function based on the comparison of the accurate account holders and absent account holders;
   updating the set of model parameters based on the recall function.

6. The computer-executed method of claim 1, further comprising a requestor that sends a request for recommending applications, wherein the requestor may include an ad network, an application developer or a third-party application service.

7. The computer-executed method of claim 1 further comprising
   transmitting, based on the numerical likelihood, a notification to one or more alternate applications executing on the client device of the account holder.

8. The computer-executed method of claim 1 further comprising
   transmitting, based on the numerical likelihood, a notification to one or more third-party applications including advertising networks, wherein one or more third-party applications including advertising networks are sent a notification based on the likelihood.

9. The computer-executed method of claim 1, wherein
   the generated application graph is associated with a plurality of predefined categories, and
   the generated application graph association is used to determine model parameters on alternate devices.

10. The computer-executed method of claim 1, wherein
    the user account of the client device is associated with a plurality of predefined categories, and
    the user account association is used to determine model parameters on alternate devices.

11. The computer-executed method of claim 1, further comprising
    identifying the at least one other application to recommend based on an other application graph associated with the other account holder;
    determining the identified at least one other application is able to execute on the other client device based on an the similarity between the application graph and the other application graph;
    recommending the at least one other application to the other account holder based on the determination.

12. The computer-executed method of claim 1, wherein the usage information of the client device is specific to one application executing on the client device.

13. A non-transitory computer-readable storage medium comprising instructions for recommending applications that when executed cause a processor to:
    receive information corresponding to one or more applications executing on a client device of an account holder;
    generate an application graph for each account holder based on the received information, wherein the application graph is a representation of usage information of applications on the client device at least including a list of predefined application categories;
    apply, for each predefined category, a computer model including a set of determined model parameters to determine a numerical likelihood that the account holder will prefer receiving applications related to the predefined category based on the generated application graph and model parameters;
    wherein the determined model parameters include a set of model account holders having a positive or negative preference for the predefined category; and recommend at least one other application of the predefined category to an other account holder, the at least one other application able to execute on an other client device of the other account holder, based on the numerical likelihood.

14. The non-transitory computer readable storage medium of claim 13, wherein the client device associated with a model account holder having a positive preference is an account holder that has an application of the predefined category executing on the client device.

15. The non-transitory computer readable storage medium of claim 13, wherein the client device associated with a model account holder having a negative preference is an account holder that has an application of the predefined category executing on the client device.

16. The non-transitory computer readable storage medium of claim 13, wherein the instructions further cause the processor to determine the set of model parameters for the computer model by:
receiving a set of metrics samples associated with previously recommended applications, the metrics samples including
a set of targeted account holders predicted to prefer applications associated with the predefined category, and
a set of accurate account holders predicted to prefer applications associated with the predefined category and having a positive preference to the application associated with the predefined category;
determining a precision function based on the comparison of the targeted account holders and accurate account holders;
updating the set of model parameters based on the precision function.

17. The non-transitory computer readable storage medium of claim 13, wherein the instructions further cause the processor to determine the set of model parameters for the computer model by:
receiving a set of metrics samples associated with previously recommended applications, the metrics samples including
a set of accurate account holders predicted to prefer applications associated with the predefined category and having a positive preference to the application associated with the predefined category, and
a set of absent account holders having a positive preference to the application associated with the predefined category;
determining a recall function based on the comparison of the accurate account holders and absent account holders;
updating the set of model parameters based on the recall function.

18. The non-transitory storage medium of claim 13, further comprising a requestor that sends a request for recommending applications, wherein the requestor may include an ad network, an application developer or a third-party application service.

19. The non-transitory computer storage medium of claim 13, wherein the instructions further cause the processor to:
transmit, based on the numerical likelihood, a notification to one or more alternate applications executing on the client device of the account holder.

20. The non-transitory computer storage medium of claim 13, wherein the instructions further cause the processor to:
transmit, based on the numerical likelihood, a notification to one or more third-party applications including advertising networks, wherein one or more third-party applications including advertising networks are sent a notification based on the likelihood.

21. The non-transitory computer storage medium of claim 13, wherein
the generated application graph is associated with a plurality of predefined categories, and
the generated application graph association is used to determine model parameters on alternate devices.

22. The non-transitory computer storage medium of claim 13, wherein
the user account of the client device is associated with a plurality of predefined categories, and
the user account association is used to determine model parameters on alternate devices.

23. The non-transitory computer storage medium of claim 13, wherein the instructions further cause the processor to:
identify the at least one other application to recommend based on an other application graph associated with the other account holder;
determine the identified at least one other application is able to execute on the other client device based on an the similarity between the application graph and the other application graph;
recommend the at least one other application to the other account holder based on the determination.

24. The non-transitory computer storage medium of claim 13, wherein the usage information of the client device is specific to one application executing on the client device.

25. A system comprising a processor and a memory storing computer program instructions for recommending applications that when executed by the processor cause the processor to:
receive information corresponding to one or more applications executing on a client device of an account holder;
generate an application graph for each account holder based on the received information, wherein the application graph is a representation of usage information of applications on the client device at least including a list of predefined application categories;
apply, for each predefined category, a computer model including a set of determined model parameters to determine a numerical likelihood that the account holder will prefer receiving applications related to the predefined category based on the generated application graph and model parameters;
wherein the determined model parameters include a set of model account holders having a positive or negative preference for the predefined category; and
recommend at least one other application of the predefined category to an other account holder, the at least one other application able to execute on an other client device of the other account holder, based on the numerical likelihood.

26. The system of claim 25, wherein the client device associated with a model account holder having a positive preference is an account holder that has an application of the predefined category executing on the client device.

27. The system of claim 25, wherein the client device associated with a model account holder having a negative preference is an account holder that has an application of the predefined category executing on the client device.

28. The system of claim 25, wherein the instructions further cause the processor to determine the set of model parameters for the computer model by:

receiving a set of metrics samples associated with previously recommended applications, the metrics samples including
- a set of targeted account holders predicted to prefer applications associated with the predefined category, and
- a set of accurate account holders predicted to prefer applications associated with the predefined category and having a positive preference to the application associated with the predefined category;

determining a precision function based on the comparison of the targeted account holders and accurate account holders;

updating the set of model parameters based on the precision function.

29. The system of claim 25, wherein the instructions further cause the processor to determine the set of model parameters for the computer model by:

receiving a set of metrics samples associated with previously recommended applications, the metrics samples including
- a set of accurate account holders predicted to prefer applications associated with the predefined category and having a positive preference to the application associated with the predefined category, and
- a set of absent account holders having a positive preference to the application associated with the predefined category;

determining a recall function based on the comparison of the accurate account holders and absent account holders;

updating the set of model parameters based on the recall function.

30. The system of claim 25, further comprising a requestor that sends a request for recommending applications, wherein the requestor may include an ad network, an application developer or a third-party application service.

31. The system of claim 25, wherein the instructions further cause the processor to:
transmit, based on the numerical likelihood, a notification to one or more alternate applications executing on the client device of the account holder.

32. The system of claim 25, wherein the instructions further cause the processor to:
transmit, based on the numerical likelihood, a notification to one or more third-party applications including advertising networks, wherein one or more third-party applications including advertising networks are sent a notification based on the likelihood.

33. The system of claim 25, wherein
the generated application graph is associated with a plurality of predefined categories, and
the generated application graph association is used to determine model parameters on alternate devices.

34. The system of claim 25, wherein
the user account of the client device is associated with a plurality of predefined categories, and
the user account association is used to determine model parameters on alternate devices.

35. The system of claim 25 wherein the instructions further cause the processor to:
identify the at least one other application to recommend based on an other application graph associated with the other account holder;
determine the identified at least one other application is able to execute on the other client device based on an the similarity between the application graph and the other application graph;
recommend the at least one other application to the other account holder based on the determination.

36. The system of claim 25, wherein the usage information of the client device is specific to one application executing on the client device.

* * * * *

UNITED STATES PATENT AND TRADEMARK OFFICE
CERTIFICATE OF CORRECTION

PATENT NO. : 9,825,987 B2  
APPLICATION NO. : 14/699922  
DATED : November 21, 2017  
INVENTOR(S) : Deepak Rao et al.

Page 1 of 1

It is certified that error appears in the above-identified patent and that said Letters Patent is hereby corrected as shown below:

In the Claims

Claim 3, Column 13, Line 34, after "account holder that" delete "has" and insert --does not have--

Claim 15, Column 15, Line 14, after "account holder that" delete "has" and insert --does not have--

Claim 27, Column 16, Line 63, after "account holder that" delete "has" and insert --does not have--

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*